M. LAUX.
OIL MEASURING DEVICE FOR GAS MACHINES.
APPLICATION FILED FEB. 28, 1913.
1,109,768. Patented Sept. 8, 1914.
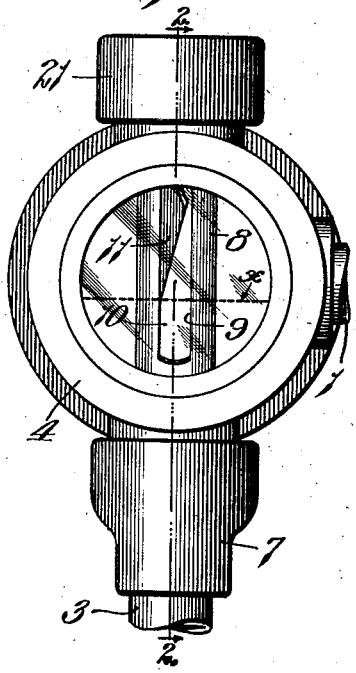
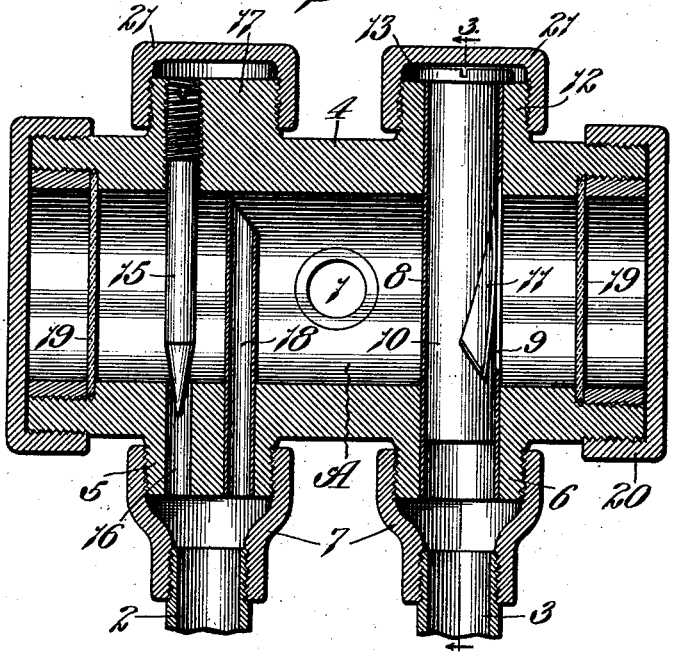
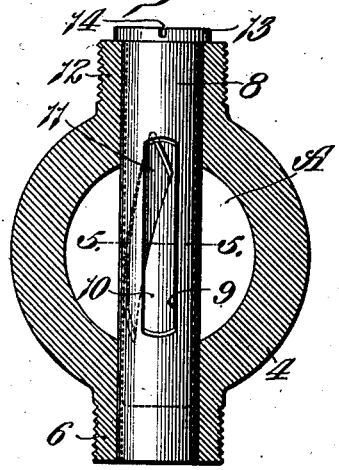
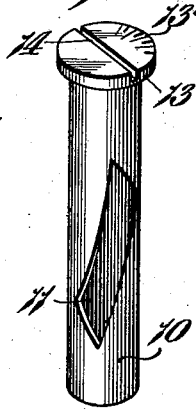
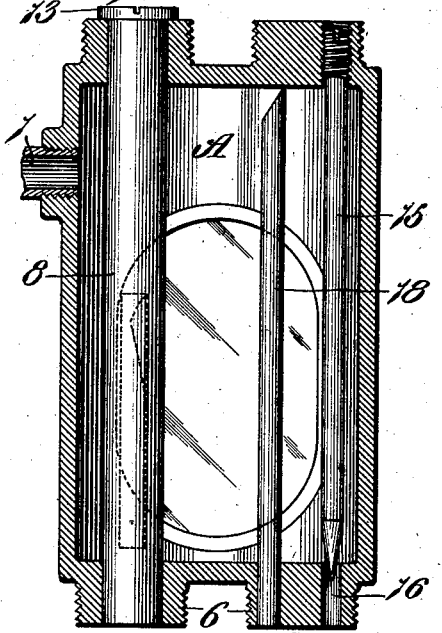

UNITED STATES PATENT OFFICE.

MATHIAS LAUX, OF ST. LOUIS, MISSOURI, ASSIGNOR TO AERO-GAS MACHINE COMPANY, OF ST. LOUIS, MISSOURI, A CORPORATION OF MAINE.

OIL-MEASURING DEVICE FOR GAS-MACHINES.

1,109,768.  Specification of Letters Patent.  Patented Sept. 8, 1914.

Application filed February 28, 1913. Serial No. 751,210.

*To all whom it may concern:*

Be it known that I, MATHIAS LAUX, a citizen of the United States, residing at St. Louis, Missouri, have invented a certain new and useful Improvement in Oil-Measuring Devices for Gas-Machines, of which the following is a full, clear, and exact description, such as will enable others skilled in the art to which it appertains to make and use the same.

This invention relates to measuring devices such as are used in gas machines for governing the quantity of hydrocarbon oil that is supplied to the carbureter of the machine.

Measuring devices of the character above-mentioned usually comprise a chamber into which charges of hydro-carbon oil are pumped, a conduit leading from said chamber to the carbureter of the machine so as to supply the oil to the carbureter, and an adjustable device for permitting all over a predetermined quantity of the hydro-carbon oil to escape from said measuring chamber back to the source of supply from which the oil is drawn, thereby causing the charges of oil that are supplied to the chamber to be measured so that only the required amount of oil will be supplied to the carbureter.

One object of my present invention is to provide a measuring device of simple construction which is so designed that it is not liable to be rendered inoperative by the paraffin and other foreign matter in the hydrocarbon oil that is supplied to the measuring chamber of the device.

Another object is to provide a measuring device for the purpose described which is so designed that a vacuum or partial vacuum cannot be created in the measuring chamber and thus cause the device to become air-locked to such an extent that the hydro-carbon oil will not flow out of said chamber to the carbureter and to the source of supply.

Another object is to provide an oil-measuring device for gas machines in which the means that regulates the quantity of oil which is supplied to the carbureter is so designed that frequent adjustment of same will not result in an open joint through which the measured oil can escape from the measuring chamber back to the source of supply. And still another object is to provide an oil-measuring device having a normally stationary valve for controlling the escape of the measured oil to the carbureter and an overflow controlling device which is so designed that the oil can be measured accurately.

Other objects and desirable features of my invention will be hereinafter pointed out.

Figure 1 of the drawings is an end elevational view of a measuring device constructed in accordance with my invention; Fig. 2 is a vertical longitudinal sectional view of said device; Fig. 3 is a transverse sectional view taken on the line 3—3 of Fig. 2; Fig. 4 is a perspective view of the adjustable element or part of the means that permits all over a certain quantity of oil to escape back to the source of supply; Fig. 5 is a horizontal sectional view taken on the line 5—5 of Fig. 3; and Fig. 6 is a vertical sectional view illustrating a slight modification of my invention.

Referring to Figs. 1 to 5 of the drawings which illustrate one form of my invention, A designates a chamber to which hydro-carbon oil is supplied, preferably by means of a pipe 1 that enters the side of said chamber at approximately the middle of same, as shown in Fig. 2. A pipe 2 is provided for conveying the measured quantity of oil to the carbureter, not shown, and a pipe 3 is provided for conducting the surplus oil or all over the measured quantity, back to the source of supply, not shown. The pipes 2 and 3 can be connected to the casing 4 of the measuring chamber in various ways but I prefer to provide the casing 4 with two bosses 5 and 6 to which the pipes 2 and 3, respectively, are connected by means of internally screw-threaded nipples 7. The means for controlling the escape of the surplus oil from the chamber A into the pipe 3 consists of a stationary tubular-shaped member 8 provided with a slot or opening 9 and a movable tubular-shaped member 10 arranged inside of the member 8 and provided with a coöperating slot or opening 11, the member 10 being adapted to be moved with relation to the member 8 so as to bring said openings into or out of registration with each other. The stationary member 8 is arranged vertically in the measuring chamber A and projects through an opening in the boss 6 on the under side of the casing 4 and also through a boss 12 on the upper side of said casing, said member 8 being permanently connected to said casing so that the oil cannot leak around same and thus escape from the measuring chamber. The opening 9 in the member 8 is preferably oblong-shaped and is vertically-disposed, and the opening 11 in the movable member 10 is oblong-shaped but it is arranged spirally or at a slight angle to the opening 9, as shown in Figs. 1, 2 and 3, so that when the member 10 is turned into such a position that its opening registers with the opening 9 a portion of the stationary member 8 will lap over a portion of the inclined slot 11 in the movable member 10 and thus form a substantially V-shaped opening, as shown in Figs. 1 and 3, through which the surplus oil can escape from the measuring chamber into the overflow pipe 3. The member 10 is provided at its upper end with an enlarged head 13 that bears upon the upper side of the boss 12 and thus prevents the member 10 from moving downwardly through the member 8, and a groove 14 is formed in said head so as to enable the member 10 to be turned by means of a screw-driver or other suitable tool. When the member 10 is adjusted in the position shown in Fig. 1, the oil level in the measuring chamber will be established at the point indicated by the dotted line $x$ in Fig. 1, all the oil in the chamber A above the point indicated by the line $x$ escaping from said chamber into the overflow pipe 3 through the substantially V-shaped opening formed by coöperating portions of the slots in the members 8 and 10 and thus causing only a predetermined quantity of oil to be supplied to the carbureter through the pipe 2.

A valve is provided for regulating the flow of the measured oil from the chamber A into the pipe 2 that leads to the carbureter, and in the preferred form of my invention, as herein shown, the valve that is used for this purpose consists of a needle-valve 15 that projects into an opening 16 which establishes communication between the chamber A and the pipe 2. The stem of the valve 15 is threaded into a boss 17 on the upper side of the casing 4, thereby enabling said valve to be adjusted so as to vary the size of the opening through which the oil escapes into the pipe 2. In practice, the valve 15 is adjusted so that the oil will escape slowly from the chamber A into the pipe 2, and said pipe 2 is large enough so that it will never be completely filled by the oil that flows through same. The object of having the oil escape from the chamber A slowly into a pipe of much greater diameter than the cross sectional area of the opening through which the oil escapes from the measuring chamber is to enable air to pass from the carbureter through the pipe 2 into the measuring chamber and thus prevent a vacuum or partial vacuum from being created in the measuring chamber. In the form of my invention herein shown a vertically-disposed vent-pipe 18 that is mounted in the boss 5 projects upwardly into the measuring chamber, as shown in Fig. 2, and thus supplies sufficient air to the upper portion of said chamber to prevent it from becoming air-locked to such a degree that the oil will not flow from said chamber through the opening 16 and through the overflow opening in the adjustable level-controlling member 10. The casing 4 is substantially cylindrical-shaped and is arranged horizontally, and pieces of glass 19 are set in the ends of said casing 4 so as to form transparent end walls for the measuring chamber. If desired, removable caps 20 can be mounted on the ends of the casing 4 so as to protect the glass end walls of the measuring chamber, and caps 21 are preferably mounted on the bosses 12 and 17 so as to prevent the valve 15 and the level-controlling device from being tampered with. The head 13 of the member 10 may be provided with graduations 13$^a$ or some other suitable means for indicating the quantity of oil that is measured and supplied to the carbureter when the member 10 is adjusted in certain positions.

If desired, the casing 4 may be arranged vertically, as shown in Fig. 6, instead of horizontally, as shown in Fig. 2, and the valve 15, vent-tube 18 and level-controlling members can be mounted in the ends of the casing, a piece of glass 19 being set in the side of the casing so as to enable the interior of the measuring chamber to be examined.

One advantage of a measuring device of the construction above-described is that there is no tendency for the oil to leak out of the measuring chamber around the means that governs the oil lever after the device has been in use for some time because said means comprises a stationary part, namely, the member 8 that is permanently connected to the casing 4, and a movable part 10 that is rotatably mounted in the stationary part 8. The member 10 can be adjusted easily owing to the fact that it is adjusted by turning or rotating same; no locking means is required to hold it in adjusted position; and as the coöperating slots in the members 8 and 10 form a substantially V-shaped overflow opening the oil can be measured accurately.

The air that is supplied to the measuring chamber through the vent-tube 18 eliminates the possibility of the oil failing to flow out of the measuring chamber on account of a vacuum or partial vacuum being created in said chamber, and in view of the fact that the air that is supplied to the measuring chamber is taken from the carbureter and not from the atmosphere surrounding the measuring chamber, the device complies with the requirements of the fire-underwriters which in certain instances prohibit any kind of a hydro-carbon oil-containing chamber on a gas machine from being vented to the atmosphere.

Still another desirable feature of my device is that the valve which governs the flow of the oil to the carbureter is normally stationary. Consequently, there is no danger of the device failing to operate properly on account of paraffin or other foreign matter in the oil collecting on the valve and thus preventing it from opening as might occur if the valve 15 was a movable valve that operated intermittently to open and close the port through which the oil escaped to the carbureter.

Having thus described my invention, what I claim as new and desire to secure by Letters Patent is:

1. In a gas machine, an oil-measuring device comprising a closed chamber to which charges of oil are supplied, adjustable means for permitting all over a certain quantity of a charge of oil that is supplied to said chamber at one time to escape from said chamber, a discharge port through which the measured oil escapes from said chamber to a conduit leading to the carbureter of the machine, a normally stationary needle valve coöperating with said discharge port for regulating the flow of the measured oil from said chamber, and means whereby air from the carbureter is supplied to said measuring chamber so as to prevent a vacuum or partial vacuum from being created in said chamber.

2. An oil-measuring device for gas machines, comprising a closed chamber to which oil is supplied, adjustable means for permitting all over a certain quantity of the oil that is supplied to said chamber at one period to escape from said chamber back to the source of supply, a conduit leading from said chamber to the carbureter of the machine, an adjustable valve that is normally stationary for controlling the flow of the measured oil from said chamber into said conduit, and a vent pipe arranged wholly within said measuring chamber for establishing communication between the interior of said conduit and said measuring chamber.

3. An oil-measuring device for gas machines, comprising a closed chamber to which oil is supplied, a stationary tubular-shaped member arranged inside of said chamber and permanently connected to the casing of the chamber, an adjustable tubular-shaped member rotatably mounted in the stationary member, and coöperating elongated slots in said members, one of said slots being disposed at an angle to the other so as to form a discharge opening of gradually increasing width from its lower to its upper end.

4. A measuring device for gas machines, comprising a casing that forms a closed measuring chamber to which oil is supplied, a stationary tubular-shaped member permanently connected to said casing and arranged in said chamber, said member being provided with a vertically disposed elongated slot, a rotatable tubular-shaped member arranged inside of said stationary member in snug engagement with same and provided with an elongated slot that extends at an angle across the slot in the stationary member so as to form an overflow opening of gradually increasing width from its lower to its upper end, and means for preventing said rotatable member from moving longitudinally with relation to said stationary member.

5. An oil-measuring device for gas machines consisting of a casing that forms a measuring chamber to which oil is supplied, an overflow pipe connected to said casing, a carbureter supply pipe connected to said casing, two telescoped tubular-shaped members provided with coöperating elongated slots arranged at an angle with relation to each other so as to form an overflow opening of gradually increasing width from its lower to its upper end through which all over a certain quantity of the oil supplied to said chamber at one period can escape into said overflow pipe, one of said members being adapted to be rotated with relation to the other so as to vary the size of said overflow opening, an adjustable needle valve for regulating the flow of the measured oil from said chamber into the carbureter supply pipe, and a vent-tube for establishing communication between said carbureter supply pipe and the interior of said casing.

6. An oil-measuring device for gas machines comprising a casing that forms a closed measuring chamber to which oil is supplied, two bosses on the under side of said casing to which an overflow pipe and a carbureter supply pipe are adapted to be connected, a stationary tubular-shaped member arranged inside of said casing and permanently connected to the boss to which the overflow pipe is fastened, an adjustable tubular-shaped member telescoped in said stationary member and provided at its upper end with an enlarged head that laps over the upper end of the stationary member, said tubular-shaped members having registering openings, a needle valve adjustably mounted in said casing and having a pointed end that projects into a discharge port in the boss to which the carbureter supply-pipe is connected, and a vent-pipe in said boss whose upper end terminates inside of said measuring chamber at a point above the normal level of the oil in said chamber.

In testimony whereof I hereunto affix my signature in the presence of two witnesses, this twenty second day of February 1913.

MATHIAS LAUX.

Witnesses:
WELLS L. CHURCH,
GEORGE BAKEWELL.